(12) United States Patent
Gjonej et al.

(10) Patent No.: US 8,893,287 B2
(45) Date of Patent: Nov. 18, 2014

(54) MONITORING AND MANAGING USER PRIVACY LEVELS

(75) Inventors: Gerard Gjonej, Seattle, WA (US); Ying Li, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 35 days.

(21) Appl. No.: 13/417,363

(22) Filed: Mar. 12, 2012

(65) Prior Publication Data

US 2013/0239220 A1  Sep. 12, 2013

(51) Int. Cl.
*H04L 29/06* (2006.01)
*G06F 21/62* (2013.01)

(52) U.S. Cl.
CPC ................... *G06F 21/6245* (2013.01)
USPC .......................................................... 726/26

(58) Field of Classification Search
CPC .................................................. G06F 21/6245
USPC .......................................................... 726/26
See application file for complete search history.

(56) References Cited

U.S. PATENT DOCUMENTS

| | | | |
|---|---|---|---|
| 6,889,213 B1 * | 5/2005 | Douvikas et al. ............... 705/67 |
| 7,069,427 B2 * | 6/2006 | Adler et al. ........................ 713/1 |
| 7,152,244 B2 * | 12/2006 | Toomey ........................... 726/26 |
| 7,603,317 B2 * | 10/2009 | Adler et al. ..................... 705/51 |
| 7,797,726 B2 * | 9/2010 | Ashley et al. ..................... 726/1 |
| 7,877,494 B2 * | 1/2011 | Carlton et al. ................. 709/229 |
| 7,962,962 B2 * | 6/2011 | Adler et al. ..................... 726/27 |
| 7,996,910 B2 * | 8/2011 | Toomey ........................... 726/26 |
| 8,046,592 B2 * | 10/2011 | Crane et al. .................... 713/193 |
| 8,069,467 B1 * | 11/2011 | Ogilvie .............................. 726/1 |
| 8,141,160 B2 * | 3/2012 | Anderson et al. ................ 726/26 |
| 8,161,526 B2 * | 4/2012 | Corrao et al. ...................... 726/2 |
| 8,225,396 B1 * | 7/2012 | Gauvin ............................ 726/22 |
| 8,261,362 B2 * | 9/2012 | Goodwin et al. ................ 726/27 |
| 8,321,918 B2 * | 11/2012 | Cho et al. ........................... 726/6 |
| 8,326,767 B1 * | 12/2012 | Ramanujan et al. ............. 705/78 |
| 8,346,532 B2 * | 1/2013 | Chakra et al. ...................... 704/1 |
| 8,370,895 B2 * | 2/2013 | DiCrescenzo et al. ............ 726/1 |
| 8,407,766 B1 * | 3/2013 | Newstadt et al. ................. 726/4 |
| 8,464,311 B2 * | 6/2013 | Ashley et al. ..................... 726/1 |
| 2001/0034723 A1 * | 10/2001 | Subramaniam ................. 705/74 |

(Continued)

OTHER PUBLICATIONS

Diaz, et al., "Towards Measuring Anonymity", In Proceedings of the 2nd International Conference on Privacy Enhancing Technologies, Apr. 14-15, 2002, 15 pages.

(Continued)

*Primary Examiner* — David Garcia Cervetti
(74) *Attorney, Agent, or Firm* — Joann Dewey; Jim Ross; Micky Minhas

(57) ABSTRACT

Various embodiments pertain to techniques for measuring a user's privacy level as a user interacts with various web services. In various embodiments, entities with which the user interacts are detected and sensitive information shared by the user is logged to determine what a given entity knows about the user. In some embodiments, sensitive information that is shared by a user can be processed using a predictive algorithm to ascertain a user's level of privacy. When a user's identity is predicted by the algorithm, a user can be alerted to the loss of anonymity. In various embodiments, user-defined areas of anonymity can be used to measure a user's definition of privacy. In some embodiments, alerts can also be provided to the user when a new, previously undisclosed, piece of information is shared by the user.

20 Claims, 6 Drawing Sheets

(56) References Cited

U.S. PATENT DOCUMENTS

| | | | |
|---|---|---|---|
| 2002/0077897 A1* | 6/2002 | Zellner et al. | 705/14 |
| 2003/0004734 A1* | 1/2003 | Adler et al. | 705/1 |
| 2003/0014418 A1* | 1/2003 | Adler et al. | 707/100 |
| 2003/0014654 A1* | 1/2003 | Adler et al. | 713/200 |
| 2004/0044628 A1* | 3/2004 | Mathew et al. | 705/51 |
| 2004/0073461 A1* | 4/2004 | Pappas | 705/3 |
| 2004/0128552 A1* | 7/2004 | Toomey | 713/201 |
| 2005/0038788 A1* | 2/2005 | Dettinger et al. | 707/10 |
| 2005/0091495 A1* | 4/2005 | Cameron et al. | 713/175 |
| 2005/0223222 A1* | 10/2005 | Graves et al. | 713/165 |
| 2006/0004772 A1* | 1/2006 | Hagan et al. | 707/10 |
| 2006/0048224 A1* | 3/2006 | Duncan et al. | 726/22 |
| 2006/0095956 A1* | 5/2006 | Ashley et al. | 726/4 |
| 2006/0136985 A1* | 6/2006 | Ashley et al. | 726/1 |
| 2007/0101427 A1* | 5/2007 | Toomey | 726/22 |
| 2007/0192630 A1* | 8/2007 | Crane et al. | 713/193 |
| 2007/0271379 A1* | 11/2007 | Carlton et al. | 709/225 |
| 2008/0103799 A1* | 5/2008 | Domenikos et al. | 705/1 |
| 2008/0103800 A1* | 5/2008 | Domenikos et al. | 705/1 |
| 2008/0126301 A1* | 5/2008 | Bank et al. | 707/3 |
| 2008/0270802 A1* | 10/2008 | Ashley et al. | 713/184 |
| 2009/0106835 A1* | 4/2009 | Corrao et al. | 726/21 |
| 2009/0171982 A1* | 7/2009 | Hagan et al. | 707/10 |
| 2009/0300512 A1* | 12/2009 | Ahn | 715/747 |
| 2009/0300714 A1* | 12/2009 | Ahn | 726/1 |
| 2009/0300715 A1* | 12/2009 | Ahn | 726/1 |
| 2009/0300716 A1* | 12/2009 | Ahn | 726/1 |
| 2010/0010824 A1* | 1/2010 | Kim et al. | 705/1 |
| 2010/0011000 A1* | 1/2010 | Chakra et al. | 707/9 |
| 2010/0046015 A1* | 2/2010 | Whittle et al. | 358/1.9 |
| 2010/0162347 A1* | 6/2010 | Barile | 726/1 |
| 2010/0169910 A1* | 7/2010 | Collins et al. | 725/14 |
| 2010/0242120 A1* | 9/2010 | Anderson et al. | 726/27 |
| 2011/0072142 A1* | 3/2011 | Herz et al. | 709/229 |
| 2011/0083159 A1* | 4/2011 | Brown et al. | 726/1 |
| 2011/0083190 A1* | 4/2011 | Brown et al. | 726/26 |
| 2011/0138480 A1* | 6/2011 | Janoulis et al. | 726/28 |
| 2011/0197255 A1* | 8/2011 | DiCrescenzo et al. | 726/1 |
| 2011/0296531 A1* | 12/2011 | Toomey | 726/26 |
| 2012/0084831 A1* | 4/2012 | Hu et al. | 726/1 |
| 2012/0096151 A1* | 4/2012 | Chernaik et al. | 709/224 |
| 2012/0131012 A1* | 5/2012 | Taylor et al. | 707/748 |
| 2012/0151551 A1* | 6/2012 | Readshaw et al. | 726/1 |
| 2012/0174236 A1* | 7/2012 | Goodwin et al. | 726/27 |
| 2012/0204260 A1* | 8/2012 | Cecil et al. | 726/22 |
| 2012/0210437 A1* | 8/2012 | Karande et al. | 726/26 |
| 2012/0284801 A1* | 11/2012 | Goodwin et al. | 726/26 |
| 2013/0024758 A1* | 1/2013 | Darby et al. | 715/205 |

OTHER PUBLICATIONS

Krishnamurthy, et al., "Measuring Privacy Loss and the Impact of Privacy Protection in Web Browsing", In Proceedings of the 3rd Symposium on Usable Privacy and Security, Jul. 18-20, 2007, pp. 52-63.

Yee, George, "Measuring Privacy Protection in Web Services", In IEEE International Conference on Web Services, Sep. 18-22, 2006, pp. 647-654.

Yu, et al., "Modeling and Measuring Privacy Risks in QoS Web Services", In Proceedings of the 8th IEEE International Conference on E-Commerce Technology and the 3rd IEEE International Conference on Enterprise Computing, E-Commerce, and E-Services, Jun. 26-29, 2006, 4 pages.

Yassine, et al., "Measuring Users' Privacy Payoff Using Intelligent Agents", In International Conference on Computational Intelligence for Measurement Systems and Applications, May 11-13, 2009, pp. 169-174.

* cited by examiner

MONITORING AND MANAGING USER PRIVACY LEVELS

BACKGROUND

The collection of vast amounts of personal data via the Internet has raised a variety of privacy-related concerns. During interactions with web service providers, users may disclose information to the service provider in order to facilitate a transaction. Privacy issues can be raised regarding the collection of, use of, sharing of, and level of control exercised over sensitive data, in addition to user access to disclosed sensitive data. Sensitive data can include a user's real name, address, email address, phone number, birth date, all or part of a user's social security number, demographic information, health information or other data that a user may regard as sensitive or personal in nature.

Internet privacy involves the ability to not only control information revealed by a user during an online session, but to also control who can access the disclosed information. For example, a user may disclose data to a web service provider without knowing that the data will be shared with another entity. As another example, a user may provide one piece of information to a first web service, and another piece of information to a second web service, that, when put together, can identify the user within a particular degree of certainty. In some situations, if a user was aware of the information being shared and the impact the disclosure can have on the user's privacy, the user may decide not to share the information or can accept that the user's identity may be known to the web service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments pertain to techniques for measuring a user's privacy level as a user interacts with various web services. In various embodiments, entities with which the user interacts are detected and sensitive information shared by the user is logged to determine what a given entity knows about the user. In some embodiments, sensitive information that is shared by a user can be processed using a predictive algorithm to ascertain a user's level of privacy. When a user's identity is predicted by the algorithm, a user can be alerted to the loss of anonymity.

In various embodiments, user-defined areas of anonymity can be used to measure a user's definition of privacy. For example, a user can indicate that health information, identity information, and financial information are considered by the user to be private information. When the predictive algorithm identifies a loss of anonymity associated with the user's health, identity, or financial information, the system can alert the user. In some embodiments, alerts can also be provided to the user when a new, previously undisclosed, piece of information is shared by the user.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments pertain to techniques for measuring a user's privacy level as a user interacts with various web services. In various embodiments, entities with which the user interacts are detected and sensitive information shared by the user is logged to determine what a given entity knows about the user. In some embodiments, sensitive information that is shared by a user can be processed using a predictive algorithm to ascertain a user's level of privacy. When a user's identity is predicted by the algorithm, a user can be alerted to the loss of anonymity. In some embodiments, prediction of the user's identity results from a combination of data that results in a positive identification of a user on a first page of search results.

In various embodiments, user-defined areas of anonymity can be used to measure a user's definition of privacy. For example, a user can indicate that health information, identity information, and financial information are considered by the user to be private information. When the predictive algorithm identifies a loss of anonymity associated with the user's health, identity, or financial information, the system can alert the user. In some embodiments, alerts can also be provided to the user when a new, previously undisclosed, piece of information is shared by the user.

In the discussion that follows, a section entitled "Example Operating Environment" describes an operating environment in accordance with one or more embodiments. Next, a section entitled "Example Embodiments" describes techniques for measuring a user's privacy level as a user interacts with various web pages or web services. In some embodiments, sensitive information that is shared by a user can be processed using a predictive algorithm to ascertain a user's level of privacy. In some embodiments, alerts can also be provided to the user when a new, previously undisclosed, piece of information is shared by the user. Finally, a section entitled "Example Device" describes an example device that can be used to implement one or more embodiments.

Consider, now, an example operating environment in accordance with one or more embodiments.

Example Operating Environment

Figure 1:
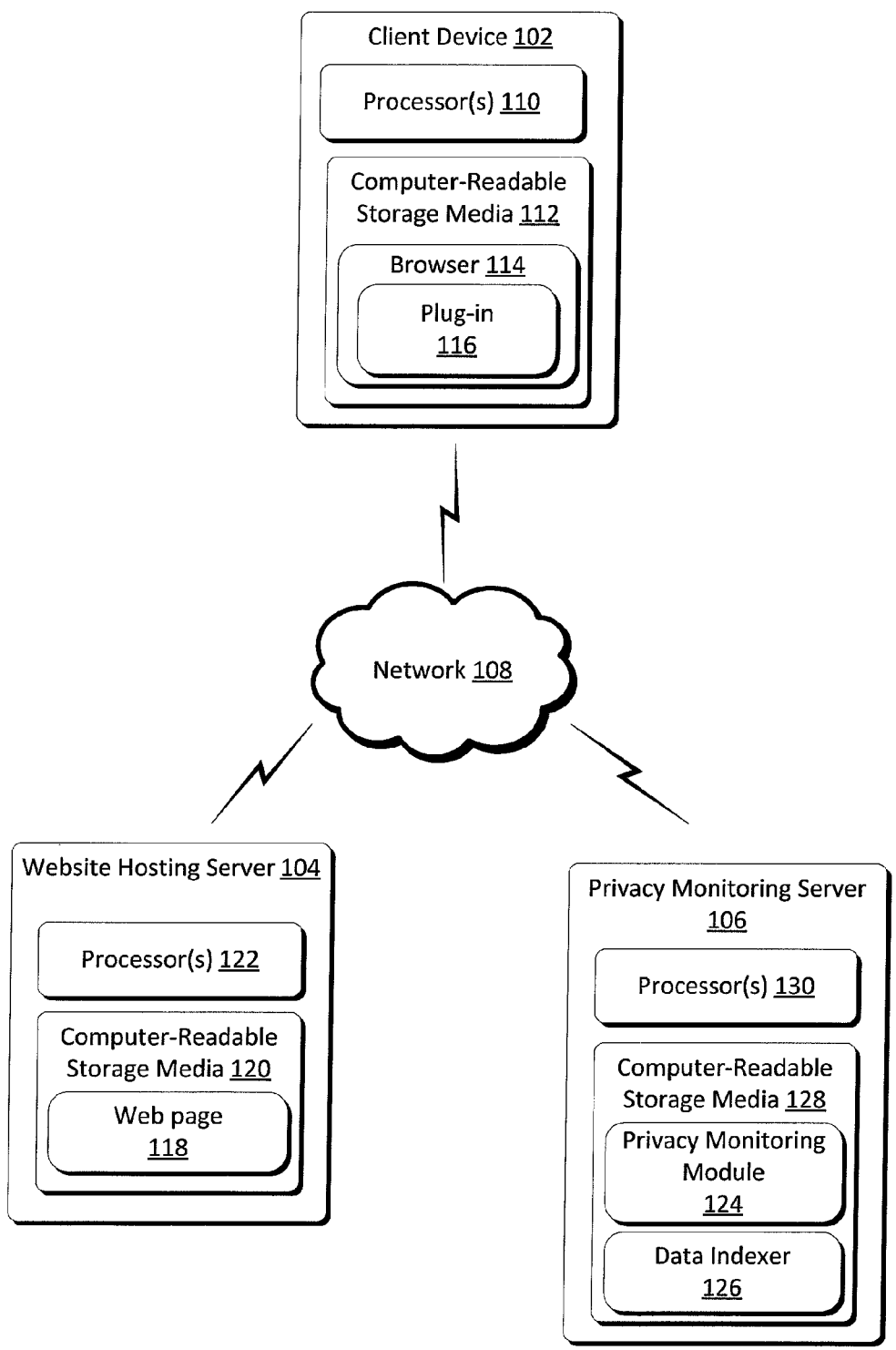
FIG. 1 illustrates an example operating environment in accordance with one or more embodiments.

FIG. 1 is an illustration of an example environment 100 in accordance with one or more embodiments. Environment 100 includes a client device 102 communicatively coupled to a website hosting server 104 and a privacy monitoring server 106 through network 108.

Client device 102 can include one or more processors 110 and computer-readable storage media 112. Client device 102 can be embodied as any suitable computing device such as, by way of example and not limitation, a desktop computer, a portable computer, a netbook, a handheld computer such as a personal digital assistant (PDA), a cell phone, and the like.

Computer-readable storage media 112 includes one or more software applications, which can include a software executable module in the form of a web browser 114. Browser 114 can receive content from and send content to other servers, such as website hosting server 104 and privacy monitoring server 106, via network 108, such as the Internet. In various embodiments, browser 114 includes a plug-in 116.

In one or more embodiments, plug-in 116 is configured to monitor data traffic between client device 102 and other devices, such as website hosting server 104. In various embodiments, plug-in 116 can detect a uniform resource locator (URL) input into an address bar of browser 114 or to which browser 114 is otherwise directed to (e.g., a link leading to the URL is selected by a user). Browser 114 receives code that causes a web page 118 to be rendered within a window of browser 114. In addition to detecting the URL to which the browser has navigated, plug-in 116 is also configured to detect data shared by a user and data included in the background of web page 118.

Data shared by a user can include information, both sensitive and non-sensitive, entered into one or more fields included on web page 118, information regarding the amount of time the website is displayed by browser 114, and the like. Data included in the background of web page 118 can include information in the code corresponding to the web page, such as hypertext markup language (HTML) or script. For example, assume that web page 118 calls another web page or website in the background. This call is coded within the HTML or script for web page 118. Plug-in 116 detects the call in the code and is configured to record the web page that is being called by web page 118.

Web page 118 resides on computer-readable storage media 120 of website hosting server 104. website hosting server 104 also includes at least one processor 122 that is configured to execute modules embodied on computer-readable storage media 120.

Plug-in 116 can track the information disclosed via client device 102. Disclosed information, including sensitive and non-sensitive data, can be grouped by entity. In various embodiments, an entity can be a single service, such as multiple web pages hosted by website hosting server 104, or it can be various entities, such as friends or connections, within a service. For example, if website hosting server 104 hosts a social network, such as Facebook®, the entire social network hosted by website hosting server 104 can be an entity, or each friend or group of friends connected to a user can be an entity (Facebook® is a registered trademark of Facebook, Inc.). An entity can be any group having access to a given segment of data.

Once data is grouped according to entity by plug-in 116, the plug-in can provide the information to privacy monitoring module 124. In some embodiments, data is transmitted to privacy monitoring module 124 before it is grouped according to entity, and privacy monitoring module 124 can group the data accordingly. Privacy monitoring module 124 is configured to receive data, such as various pieces of sensitive data shared with one or more entities and recorded by plug-in 116, and return information regarding the privacy level of a user.

Privacy monitoring module 124 resides with a data indexer 126 on computer-readable storage media 128 on privacy monitoring server 106. Privacy monitoring server 106 also includes at least one processor 130 that is configured to execute various modules embodied on computer-readable storage media 128, such as privacy monitoring module 124.

In various embodiments, combinations of data shared with a particular entity are entered into a query algorithms and compared to data indexer 126. If the information returned by data indexer 126 includes a positive identification of the user or returns a high probability score that the user can be identified, privacy monitoring module 124 can provide a notification to client device 102 that the user has potentially lost anonymity. In some embodiments, the query algorithms and data indexer can be part of a search engine, and a positive identification indicates that an entity entering the data combination into a search engine web page can result in a positive identification of the user on the first page of listings or within the first N results, e.g., first 10 results, presented on a search engine results page (SERP).

In various embodiments, privacy monitoring module 124 is further configured to receive information from plug-in 116 as well as directly from website hosting servers, such as website hosting server 104. For example, privacy monitoring module 124 can receive information from plug-in 116 on a user's primary device, and can receive information from the website hosting server 104 when the user has accessed hosted content, such as web page 118, from an alternate device, such as a mobile device. The privacy monitoring module 124 is configured to sort the disclosed sensitive data according to entity and can submit one or more queries to determine a privacy level for the user.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Generally, any of the functions described herein can be implemented using software, firmware, hardware (e.g., fixed logic circuitry) or a combination of these implementations. The terms "module," "functionality," and "logic" as used herein generally represent software, firmware, hardware, or a combination thereof. In the case of a software implementation, the module, functionality, or logic represent program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Environment 100 is referenced by the following description of various embodiments in which user privacy is monitored and managed.

Example Embodiments

Figure 2:
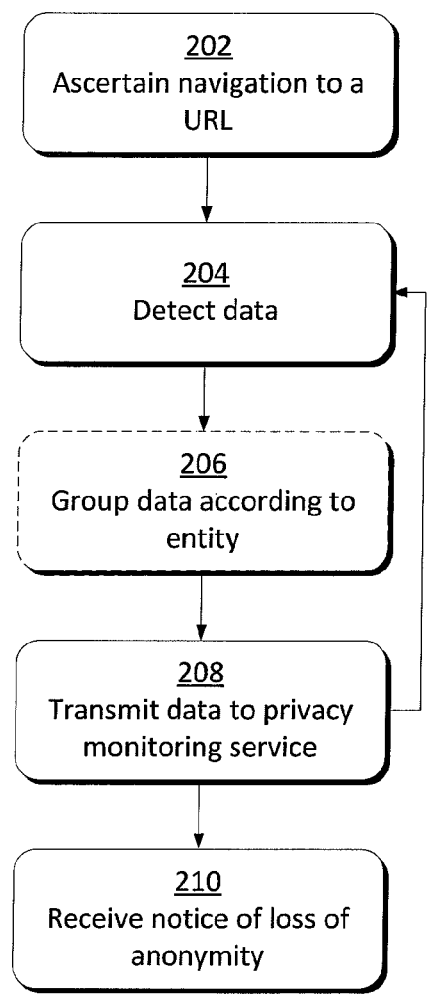
FIG. 2 depicts an example process for detecting data disclosed to an entity in accordance with one or more embodiments.

FIG. 2 illustrates an example process 200 for detecting data disclosed in accordance with one or more embodiments. The process can be implemented in connection with any suitable hardware, software, firmware, or combination thereof. In at least some embodiments, the process can be implemented in software, such as plug-in 116.

Block 202 ascertains a navigation to a URL. This can be performed in any suitable way. For example, plug-in 116 can ascertain that a user has entered a URL into an address bar in a web browser user interface, has selected a link causing the browser to be redirected to the URL, or has otherwise navigated to the URL. In some embodiments, information regarding navigation to the URL, such as the name of the web page to which the URL leads, can be logged and included with other collected data.

Next, block 204 detects data that is provided as part of a user's interaction. This can be performed in any suitable way. For example, plug-in 116 can extract data transmitted as part of a user query or a user input into a web page, such as answers filled into a user profile web form. In some embodiments, data can be extracted from HTML, script, or other code of the web page. For example, if the web page to which the user has navigated calls another web page in the background, data regarding the called web page can be detected. Other data included in the code of the web page can be extracted as well, such as, by way of example and not limitation, data regarding the IP address from which the request for the page was transmitted, user login credential information, information regarding a user's previous request for the web page, or time spent viewing the web page.

Optionally, block 206 groups the data according to entity. This can be performed in any suitable way. For example, data relating a user's search query and links on a resultant search engine results page (SERP) visited by the user, can be grouped together to represent information disclosed to the search engine provider. As another example, data associated with a user's visit to the MSN® website, such as a page view history within the MSN® website and keywords extracted from a user's search on Bing® can be grouped together because the user accessed all of these pages while logged in with an MSN® account, while data associated with a user's visit to Facebook®, such as pages the user "likes" or personal information included on the user's profile, can be grouped separately from the data from MSN® and Bing® (MSN® and Bing® are registered trademarks of Microsoft Corporation; Facebook® is a registered trademark of Facebook, Inc.).

In some embodiments, such as when a user has linked multiple accounts, such as linking a Facebook® account and an MSN® account, the data can be grouped in a single entity, as the linked accounts can enable information from one account or disclosed to one website to be accessed by the other. In various embodiments, disclosed data can belong to more than one entity.

In various embodiments, an entity may not include an entire website. For example, if a user shares some information in an online profile with one group but shares different information with another group on the same website, each of these groups can be a distinct entity for the purposes of sorting and evaluating disclosed data. For example, assume that a user has a "family" group and a "coworkers" group on a social network. The user can share some information, such as pictures from family events, personal telephone numbers, and birthday information with users in the family group, while keeping this information private from users in the coworkers group. The user may share other information, such as a work email address and a work phone number, with the coworker group and not the family group. In addition, the user may decide to share other information, such as a city of residence and education information, with both users in the family and coworkers groups. In this example, data shared only to the family group (e.g., pictures from family events, personal telephone numbers, and birthday information) and data shared with both the family and coworkers groups (e.g., city of residence and education information) can be grouped together in one entity that includes all information known to other users in the family group. Likewise, data shared only to the coworkers group (e.g., work email address and work phone number) and data shared with both the family and coworkers groups (e.g., city of residence and education information) can be grouped together into an entity that includes all information known to other users in the coworkers group.

In embodiments where block 206 is not included, the data can be grouped according to entity by another module or device, such as privacy monitoring module 124 hosted on privacy monitoring server 106.

Next, block 208 transmits data to a privacy monitoring service. This can be performed in any suitable way. For example, plug-in 116 can transmit the data to privacy monitoring module 124 via network 108. Once one or more pieces of data are transmitted, the process returns to block 204 to detect disclosure of additional data.

Next, block 210 receives a notice of loss of anonymity. This can be performed in any suitable way. For example, upon determining that the data disclosed to a particular entity has resulted in a positive identification of the user or a loss of privacy according to the user's defined preferences, privacy monitoring module 124 can transmit a notice that is received by plug-in 116. The plug-in 116 can then cause the notice to be displayed to the user. For example, the plug-in can cause a pop-up within the browser to be displayed.

Figure 3:
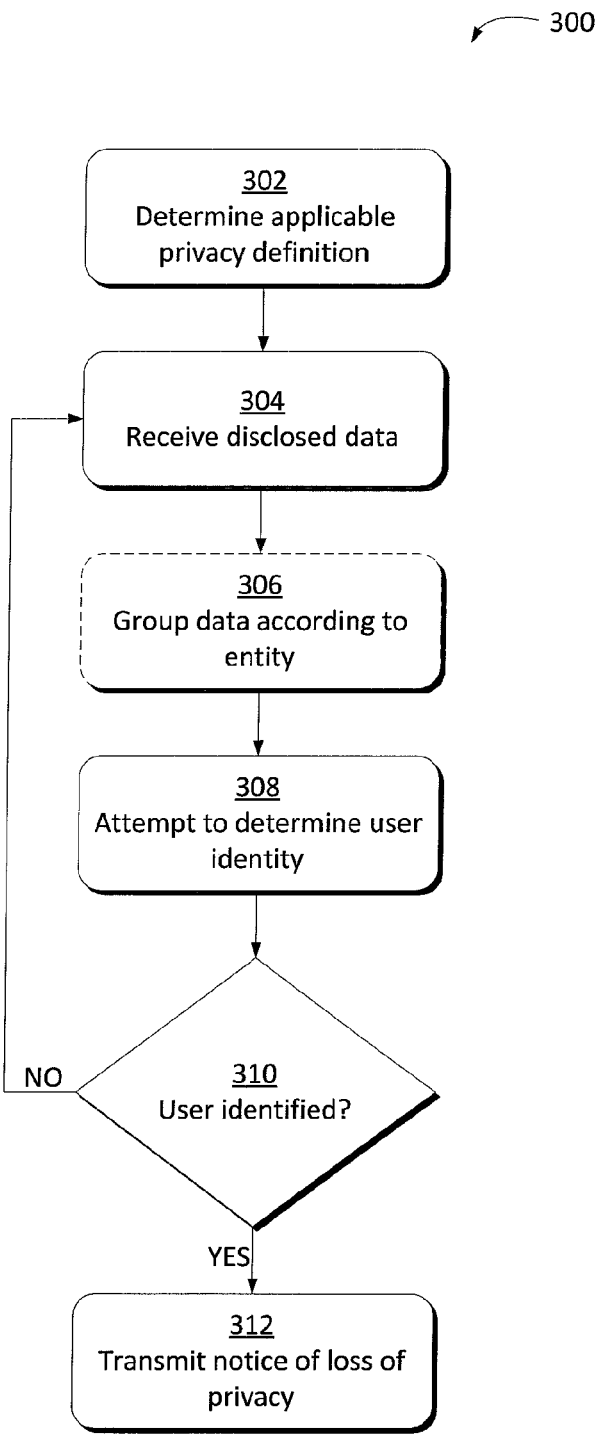
FIG. 3 depicts an example process for determining a user's loss of privacy in accordance with one or more embodiments.

FIG. 3 illustrates an example process 300 for determining a user's level of privacy in accordance with one or more embodiments. The process can be implemented in connection with any suitable hardware, software, firmware, or combination thereof. In at least some embodiments, the process can be implemented in software, such as privacy monitoring module 124.

Block 302 determines an applicable privacy definition. This can be performed in any suitable way. For example, a default privacy definition can be applied such that a user's home address, telephone number, social security number, date of birth, or other similar information is considered sensitive information. In various embodiments, a user can customize the privacy definition applied, such as to include financial information, health information, or other types of personal and sensitive information. The privacy definition can include various pieces of information that, when disclosed and/or linked to a user's name, can trigger a user's loss of privacy and/or anonymity.

Block 304 receives disclosed data. This can be performed in any suitable way. For example, privacy monitoring module 124 can receive data disclosed via client device 102 and detected by plug-in 116. In some embodiments, privacy monitoring module 124 can receive data from one or more web services or websites. For example, a user may have installed a plug-in, such as plug-in 116, on a primary device, such as a home computer, but may access a web service or web page from other devices, such as a work computer or mobile device. Privacy monitoring module 124 can receive information regarding the data disclosed by the user on these secondary devices from the web service or web page directly, such as through an association of the data with a user's login credentials, in order to obtain a more complete picture regarding the information shared by the user. In such embodiments, a user's login credentials for various web services or web pages can be provided to the privacy monitoring service by the user when the user creates an account with the privacy monitoring service, completes a user profile with the privacy monitoring service, or otherwise engages the service to monitor the user's privacy.

Block 306 optionally groups data according to entity. In some embodiments, such as when the plug-in 116 has grouped the data according to entity and the privacy monitoring module 124 does not receive additional data from other sources, block 306 can be omitted. In other embodiments, such as when plug-in 116 has not sorted the disclosed data and/or the privacy monitoring module 124 receives data from other sources in addition to the plug-in 116, data is sorted and grouped according to entity. This can be performed in any suitable way, examples of which are provided above.

Next, block 308 attempts to determine the identity of the user based on data for a particular entity. This can be performed in any suitable way. For example, a portion of the data associated with a particular entity can be entered into an algorithm and compared to a data index, such as an index maintained by data indexer 126, to determine if the identity of the user can be determined from the disclosed data. As an example, the data shared with a search engine provider (e.g., keywords included in user queries and information from links visited by the user) can be combined in various ways and a probability of identifying the user can be determined. Assume, for example, a user has searched for "Microsoft," "Boise, Id.," a cousin named "John Smith," and a particular medicine on a search engine. The data included in the entity can also include the location of the user (such as through reverse IP lookup). The data points can be processed using one or more algorithms, and when compared to a data index, can determine that the data could lead to a top result for a Microsoft employee named Jane Smith who is from Boise.

Block 310 determines if the user has been identified. This can be performed in any suitable way. If the user has not been identified, such as when a user's name or personal information is not returned as a top result in the data index, the process can return to block 304 to receive additional disclosed data. If, however, the top result in the data index matches information included in the user's profile and/or privacy definition, block 310 can conclude that the user's identity can be determined, and block 312 transmits a notice of loss of privacy. A user can be concluded to be likely identified if the user's name or other identifying information is returned as one of the top results of the data indexer, is returned on the first page of results of the data indexer. In some embodiments, identifying information can be something other than information unique to a user, such as a name or social security number. For example, certain demographic information, when combined together, can result in a likelihood of a match to the user. For example, while "users within the Cincinnati, Ohio area" can be a large group in which a user may not be readily identified, "female users aged 24-30 within the Cincinnati, Ohio area with professional degrees" can be a much smaller group from which a user's identity can be ascertained. This information can return a notice of loss of privacy, depending on the size of the identified group. In such embodiments, a likelihood that the entity can determine the user can be sufficient to determine that the user has been identified. The likelihood can be a 75% or greater chance of identifying the user, a 90% chance or greater of identifying the user, or another number that can vary depending on the particular embodiment.

Block 312 transmits a notice of loss of privacy to the user. This can be performed in any suitable way. For example, privacy monitoring module 124 can transmit a message to client device 102 to be displayed, notifying a user that anonymity or privacy of the user to a particular entity has been lost. In some embodiments, privacy monitoring module 124 can periodically transmit a list of web pages or entities that have a greater than X%, e.g., 75% chance of identifying the user. The specific likelihood of the website or entity identifying the user for inclusion on the list or report can vary depending on the particular embodiment. In still other embodiments, notices regarding a loss of privacy can include information regarding with what other parties or entities an entity is sharing information, such as via calls included on the web page.

In various embodiments, merely knowing that a particular entity can identify a user may not be enough. For example, if a user has input sensitive information or completed a user profile in order to obtain log-in credentials, the user can assume that when the login credentials are used, the entity can identify the user. Sensitive information provided in the user profile can include, for example, a first name, last name, date of birth, location of residence (e.g., street address, city, state, and/or zip code), phone number, email address, or age. The particular information included in the user profile can depend on the particular web service. For example, if the web service is a shopping service, financial information such as a credit card number and/or billing address can be included. As another example, if the web service is a health-related service, health information such as height, weight, medical history, and/or health insurance information can be included. In various embodiments, completion of a user profile with this sensitive data can result in the web service providing a personalized experience. Where the user knows or can assume that an entity can identify the user, some users may desire how much the entity knows about them.

Figure 4:
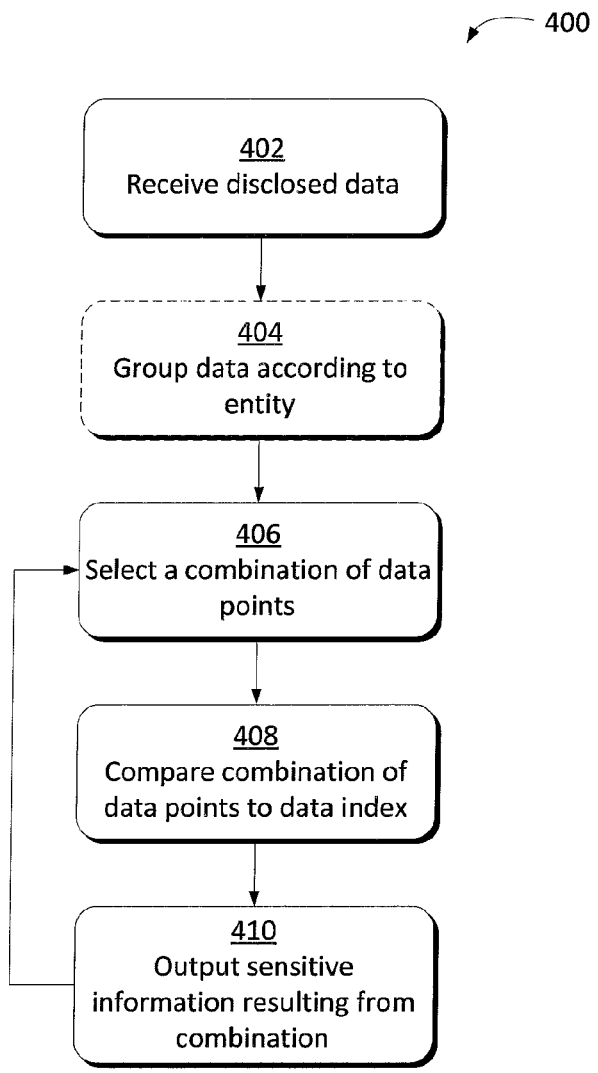
FIG. 4 depicts an example process for determining information that can be ascertained by an entity in accordance with one or more embodiments.

FIG. 4 illustrates an example process 400 for determining what an entity can determine about a user in accordance with one or more embodiments. The process can be implemented in connection with any suitable hardware, software, firmware, or combination thereof. In at least some embodiments, the process can be implemented in software, such as privacy monitoring module 124.

Block 402 receives disclosed data. This can be performed in any suitable way. For example, disclosed data can be received from a plug-in on a client device, such as plug-in 116, or can be received from a website hosting server, such as website hosting server 104.

Optionally, block 404 groups data according to entity. In some embodiments, such as when the plug-in 116 has grouped the data according to entity and the privacy monitoring module 124 does not receive additional data from other sources, block 404 can be omitted. In other embodiments, such as when plug-in 116 has not sorted the disclosed data and/or the privacy monitoring module 124 receives data from other sources in addition to the plug-in 116, data is sorted and grouped according to entity. This can be performed in any suitable way, examples of which are provided above.

Next, block 406 selects a combination of data points. This can be performed in any suitable way. For example, when a user has disclosed a first name, last name, and date of birth to an entity, the three points can form a combination. If the user has also disclosed an age to the entity, combinations can be formed from the first name/last name/age, the last name/date of birth/age, the last name/age, and so on. Combinations can include two or more data points. In some embodiments, single data points can be used to determine how sensitive a particular piece of data can be. For instance, a user's social security number may return much more information than a user's age.

Block 408 compares the combination of data points to a data index. This can be performed in any suitable way. For example, the data points can be processed using one or more algorithms for finding data in a data index, such as a search engine data index, and when compared to the data index, can be used to determine that the data could lead to information regarding a user's educational accomplishments, a user's current, job, or a user's page on a social network.

Block 410 outputs sensitive information obtainable from the combination. This can be performed in any suitable way. For example, if information previously indicated by a user to be included in a privacy definition can be determined based on a combination of data points provided to an entity, a notification can be transmitted to the user. A notification to a user can indicate that a particular item of sensitive information may be ascertained by an entity or can include a listing of various pieces of sensitive information that may be ascertained by the entity. In some embodiments, periodic reports (such as weekly or monthly reports) can show a user how much an entity may have learned about the user over the particular period or a history of the user's interaction with the entity.

The process can return to block 406 and select a different combination of data points for processing. The combination can be a new combination of the data points disclosed to the same entity, or can be a combination of data points disclosed to a different entity.

As users become aware that their anonymity or privacy is being or has the potential to be lost, as well as what certain entity can learn about them based on the information they disclose to an entity, some users may endeavor to make more intelligent choices when it comes to sharing information with some entities.

Figure 5:
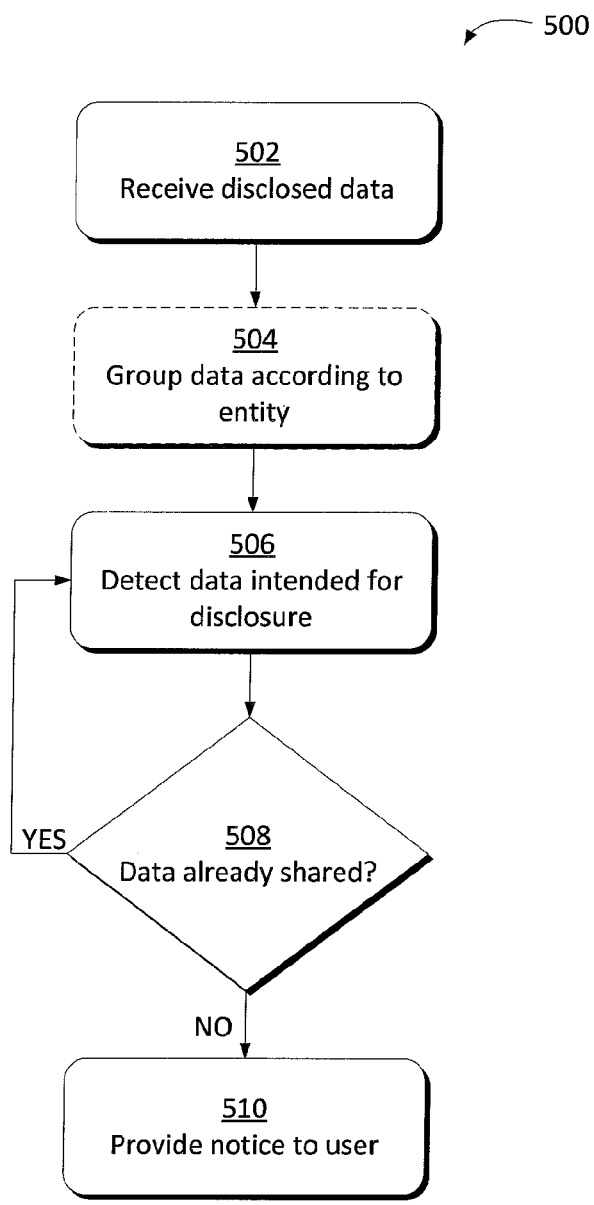
FIG. 5 depicts an example process for assisting a user in determining whether to share data in accordance with one or more embodiments.

FIG. 5 illustrates an example process 500 for assisting a user in making disclosure choices in accordance with one or more embodiments. The process can be implemented in connection with any suitable hardware, software, firmware, or combination thereof. In at least some embodiments, the process can be implemented in software, such as plug-in 116.

Block 502 receives disclosed data. This can be performed in any suitable way. For example, plug-in 116 can detect sensitive data that is disclosed by a user of client device 102, or can receive sensitive data disclosed by a user from privacy monitoring server 106 via network 108. Received disclosed data can include, for example, sensitive data or data that contributes to a loss of a user's anonymity.

Optionally, block 504 groups data according to entity. In some embodiments, such as when the plug-in 116 has received data from privacy monitoring server 106 that has already been grouped, block 504 can be omitted. In other embodiments, such as when plug-in 116 receives data from multiple sources, data is sorted and grouped according to entity. This can be performed in any suitable way, examples of which are provided above.

Block 506 detects data intended for disclosure. This can be performed in any suitable way. For example, plug-in 116 can detect a user input into a web page, such as answers filled into a user profile web form or other information that will be sent to a server as part of a web page request. In some embodiments, data can be extracted from HTML, script, or other code of the web page. For example, if the web page to which the user has navigated calls another web page in the background, data regarding the called web page can be detected. Other data included in the code of the web page can be extracted as well, such as, by way of example and not limitation, data regarding the IP address from which the request for the page was transmitted, user login credential information, information regarding a user's previous request for the web page, or time spent viewing the web page. In various embodiments, plug-in 116 detects the data before it is transmitted from the client device.

Block 508 determines if the data intended for disclosure was already shared to the entity. This can be performed in any suitable way. For example, plug-in 116 can compare the data detected by block 506 to the data groups according to the entity with which the detected data will be shared. For example, if the user has entered a query into a BING® search box, the plug-in can compare data in the query, such as keywords, to data grouped as already having been disclosed to BING®.

If block 508 determines that the data detected by block 506 has already been disclosed to the entity, the process can return from block 508 to block 506 to detect additional data to be disclosed to the entity. For example, if the user has already shared certain information with an entity, sharing the information again will not change what the entity knows about the user.

If, however, the data has not previously been shared with the entity, block 510 provides a notice to the user. This can be performed in any suitable way. For example, plug-in 116 may cause a pop-up to be displayed by browser 114 to confirm that the user wants to share the information. In some embodiments, the notice can include an option for the user to determine what disclosure of the detected data will enable an entity to learn about the user.

If a user selects the option to determine the result of disclosure of the detected data, the detected data can be transmitted to the privacy monitoring module 124 for tentative inclusion in the entity. Privacy monitoring module 124 can determine what the entity can determine about the user when this piece of data is included in the data points, such as through process 400, and can output sensitive information resulting from combinations including the data detected by block 506.

For example, assume a user has already shared her first name, last name, and city of residence with a website. The sharing may have occurred when the user completed a user profile, for instance. These data points can be logged and categorized according to the entity.

Upon a subsequent visit to the website, the user may fill in a survey in which the user indicates an applicable age range, a marital status, and an income range. Upon detecting the information input by the user, plug-in 116 can provide a pop-up to notify the user that this information has not yet been disclosed to this particular entity and is currently not within the knowledge the entity has about the user based on the information already disclosed to it.

The user, curious to learn about the consequences of sharing this information, can select an option on the pop-up that says "Tell me more." The plug-in 116 can transmit the applicable age range, marital status, and income range to the privacy monitoring module 124, which returns a list of sensitive information the entity can learn about the user based upon the data already disclosed and the data the user intends to disclose. The user can decide to continue and share the new information with the entity, or can decide to not complete the survey because the entity could determine more information about the user than the user would like.

In various embodiments, a privacy mode is provided as part of one or more executable modules or applications. The privacy mode can modify the behavior or configuration of the executable module based on the risk of a loss of anonymity or privacy of the user. For example, a web browser may automatically change to a "private browsing" mode when a user is inputting sensitive health data. In some embodiments, the privacy mode can be automatically engaged when a user's risk of losing privacy exceeds a threshold risk value. In various embodiments, privacy mode can be engaged based on an entity with which the executable module is interacting, an amount of information the entity knows about a user, and/or an amount of new information the interaction with the entity would render obtainable.

Having considered various embodiments in which user privacy is monitored and managed, consider now a device that can be utilized to implement one or more embodiments.

Example Device

Figure 6:
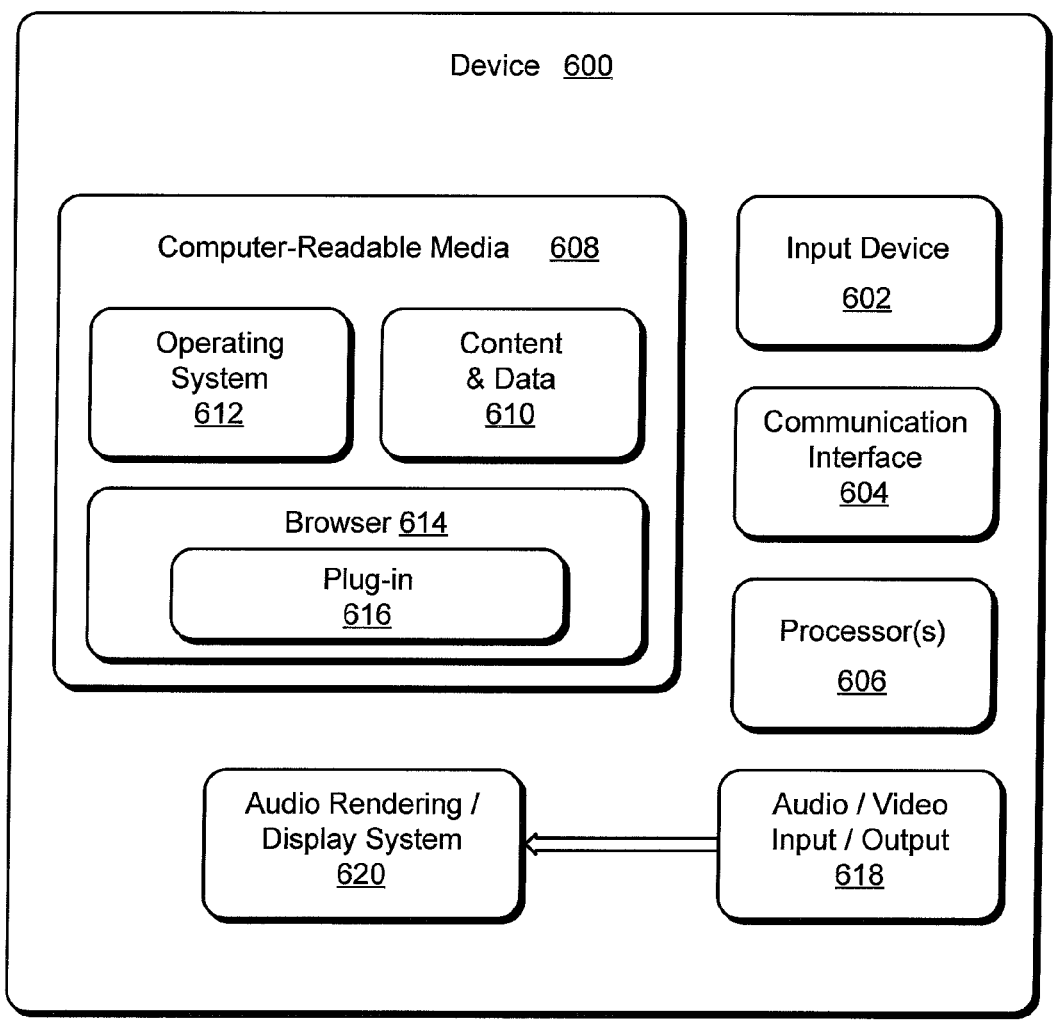
FIG. 6 is a block diagram of an example device that can be used to implement one or more embodiments.

FIG. 6 illustrates an example computing device 600 that can be used to implement the various embodiments described above. Computing device 600 can be, for example, client computing device 102 of FIG. 1, or any other suitable computing device.

Device 600 includes input device 602 that may include Internet Protocol (IP) input devices as well as other input devices, such as a keyboard. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface can enable device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 608 provides data storage to store content and data 610, as well as device executable modules and any other types of information and/or data related to operational aspects of device 600. One such configuration of a computer-readable medium is signal bearing medium and thus is configured to transmit the instructions (e.g., as a carrier wave) to the hardware of the computing device, such as via the network 108. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 612 can be maintained as a computer executable module with the computer-readable media 608 and executed on processor 606. Device executable modules can also include browser 614 which can include a plug-in 616 as described above and below. Plug-in 616 can be, for example, plug-in 116. In various embodiments, the functionality of plug-in 116 can be performed by an integral part of the browser, and plug-in 616 is not required.

Device 600 also includes an audio and/or video input/output 618 that provides audio and/or video data to an audio rendering and/or display system 620. The audio rendering and/or display system 620 can be implemented as integrated component(s) of the example device 600, and can include any components that process, display, and/or otherwise render audio, video, and image data.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable storage devices. The features of the techniques described above are platform-independent, meaning that the techniques may be implemented on a variety of commercial computing platforms having a variety of processors.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A computer-implemented method comprising:
   receiving data previously disclosed by a user to one or more entities;
   determining, by a privacy monitoring module at one or more computing devices, whether an identity of the user disclosing the data can be determined by the one or more entities from the previously disclosed data, the determining comprising entering at least a portion of the previously disclosed data into a predictive algorithm, and determining that the identity of the user can be determined if the identity of the user is predicted by the predictive algorithm; and
   responsive to determining that the identity of the user can be determined by the one or more entities from the previously disclosed data, transmitting a loss of privacy notice to a device associated with the user.

2. The computer-implemented method of claim 1, wherein receiving the data previously disclosed by the user further comprises receiving one or more of:
   data transmitted as part of a user query;
   data input into a web page;
   data extracted from HTML, script, or other code of a web page;
   data regarding a called web page;
   data regarding an IP address from which a request for a web page was transmitted;
   user login credential information;
   information regarding a user's previous request for a web page; or
   data regarding time spent viewing a web page.

3. The computer-implemented method of claim 1, further comprising:
   grouping the previously disclosed data into one or more groups based on the one or more entities to which the data was disclosed.

4. The computer-implemented method of claim 3, wherein grouping the previously disclosed data into one or more groups further comprises grouping the previously disclosed data into one or more groups based on a web page to which the data was disclosed.

5. The computer-implemented method of claim 3, wherein grouping the previously disclosed data into one or more groups further comprises grouping the previously disclosed data into one or more groups based on a group of connections on a social network to which the data was disclosed.

6. The computer-implemented method of claim 3, wherein determining whether the identity of the user disclosing the data can be determined by the one or more entities from the previously disclosed data further comprises:
- entering at least a portion of the previously disclosed data in one of the one or more groups into the predictive algorithm for finding data in a data index; and
- determining, based on the data index, if the identity of the user can be determined from the previously disclosed data.

7. The computer-implemented method of claim 6, wherein the determining that the identity of the user disclosing the data can be determined is performed responsive to: a name of the user being returned as a top result in the data index, a name of the user being returned on a first page of results in the data index, identifying information unique to the user being returned as a top result in the data index, or identifying information unique to the user being returned on a first page of results in the data index.

8. The computer-implemented method of claim 6, wherein the determining the identity of the user disclosing the data can be determined is performed responsive to determining, based on the previously disclosed data, a likelihood of a match to the user.

9. One or more computer-readable storage media comprising instructions stored thereon that, responsive to execution by a device, cause the device to perform operations comprising:
- receiving a plurality of data points previously disclosed by a user to an entity;
- selecting a combination of the plurality of data points previously disclosed by the user to the entity;
- determining, based on comparing the combination of the plurality of data points previously disclosed by the user to the entity with a data index, whether sensitive information corresponding to the user can be obtained by the entity based on the combination of the plurality of data points; and
- outputting a notification to a device associated with the user to indicate that the sensitive information is obtainable by the entity based on the combination.

10. The one or more computer-readable storage media of claim 9, wherein the sensitive information comprises one or more of:
- information regarding the user's educational accomplishments, information regarding the user's current job, information regarding the user's page on a social network, the user's name, the user's date of birth, a location of the user's residence, the user's phone number, the user's email address, the user's credit card number, the user's medical history, or the user's health insurance information.

11. The one or more computer-readable storage media of claim 9, further comprising outputting at least one of:
- a listing of various pieces of sensitive information obtainable by the entity, or a periodic report showing sensitive information obtainable by the entity over a history of the user's interaction with the entity.

12. The one or more computer-readable storage media of claim 9, wherein the plurality of data points previously disclosed by the user to the entity comprise one or more of:
- data transmitted as part of a user query;
- data input into a web page;
- data extracted from HTML, script, or other code of a web page;
- data regarding a called web page;
- data regarding an IP address from which a request for a web page was transmitted;
- user login credential information;
- information regarding a user's previous request for a web page; or
- data regarding time spent viewing a web page.

13. A device comprising:
- one or more processors;
- one or more computer-readable storage media; and
- one or more modules embodied on the one or more computer-readable storage media and executable under the influence of the one or more processors, the one or more modules configured to:
  - detect data intended for disclosure by a user of the device to an entity;
  - transmit the data intended for disclosure to a privacy monitoring service prior to the data being disclosed to the entity; and
  - receive, from the privacy monitoring service, a loss of anonymity notice indicating that an identity of the user of the device can be determined by the entity if the data intended for disclosure is disclosed to the entity.

14. The device of claim 13, wherein the entity comprises one of:
- a web page;
- a plurality of web pages; or
- a group of connections on a social network.

15. The device of claim 13, wherein the data intended for disclosure comprises one or more of:
- data to be transmitted as part of a user query;
- data input into a web page;
- data extracted from HTML, script, or other code of a web page;
- data regarding a called web page;
- data regarding an IP address from which a request for a web page was transmitted;
- user login credential information;
- information regarding a user's previous request for a web page; or
- data regarding time spent viewing a web page.

16. The device of claim 13, wherein the one or more modules are further configured to:
- determine that the data intended for disclosure has not previously been disclosed to the entity; and
- provide a notice that the data intended for disclosure has not been previously disclosed to the entity.

17. The device of claim 16, wherein the data intended for disclosure is determined to not have been previously disclosed to the entity based on a comparison of the data intended for disclosure with data previously disclosed to the entity.

18. The device of claim 13, wherein the loss of anonymity notice requests that the user verify disclosure of the data intended for disclosure to the entity.

19. The device of claim 13, wherein the loss of anonymity notice includes an option for the user to determine what the entity can learn about the user if the data intended for disclosure is disclosed to the entity.

20. The device of claim 13, wherein the privacy monitoring service is configured to determine that the identity of the user can be determined by the entity based on the data intended for disclosure and data previously disclosed to the entity.

* * * * *